US006417465B1

(12) United States Patent
Cullen

(10) Patent No.: US 6,417,465 B1
(45) Date of Patent: Jul. 9, 2002

(54) GROUND-CONFORMING PORTABLE TRUCK SCALE

(75) Inventor: Steven R. Cullen, Astoria, OR (US)

(73) Assignee: Versa Corporation, Astoria, OR (US)

(*) Notice: Subject to any disclaimer, the term of this patent is extended or adjusted under 35 U.S.C. 154(b) by 0 days.

(21) Appl. No.: 09/441,789

(22) Filed: Nov. 17, 1999

(51) Int. Cl.$^7$ .................. G01G 21/00; G01G 19/02; G01G 19/08
(52) U.S. Cl. .................. 177/126; 177/133; 177/136
(58) Field of Search .................. 177/126, 132, 177/133, 134, 135, 136

(56) References Cited

U.S. PATENT DOCUMENTS

| | | | | |
|---|---|---|---|---|
| 2,869,855 A | * | 1/1959 | Murphy | 177/133 |
| 3,043,386 A | * | 7/1962 | Marion et al. | 177/133 |
| 3,097,713 A | * | 7/1963 | Murphy | 177/133 |
| 3,135,401 A | * | 6/1964 | Schramm | 177/136 |
| 3,167,141 A | * | 1/1965 | Murphy | 177/133 |
| 3,196,965 A | * | 7/1965 | Schramm | 177/136 |
| 3,272,269 A | * | 9/1966 | Murphy | 177/133 |
| 3,444,942 A | * | 5/1969 | Murphy | 177/133 |
| 3,447,618 A | * | 6/1969 | Murphy | 177/133 |
| 3,472,329 A | * | 10/1969 | Smith | 177/133 |
| 3,580,343 A | * | 5/1971 | Hogue | 177/136 |
| 3,695,213 A | * | 10/1972 | Littlefield | 177/136 |
| 4,066,140 A | * | 1/1978 | Conley | 177/134 |
| 4,258,814 A | * | 3/1981 | Dillon | 177/126 |
| 4,266,624 A | * | 5/1981 | Dillon et al. | 177/134 |
| 4,280,576 A | * | 7/1981 | Smith, Jr. | 177/126 |
| 4,281,728 A | * | 8/1981 | Dickason et al. | 177/134 |
| 4,666,003 A | * | 5/1987 | Reichow | 177/136 |
| 4,828,055 A | * | 5/1989 | Hamilton et al. | 177/134 |
| 4,874,050 A | * | 10/1989 | Strasser et al. | 177/134 |
| 4,905,780 A | * | 3/1990 | Goff, III | 177/136 |
| 4,921,059 A | * | 5/1990 | Woodle, IV et al. | 177/136 |
| 5,308,933 A | * | 5/1994 | Ahl | 177/135 |
| 5,739,477 A | * | 4/1998 | Queen | 177/126 |
| 6,046,412 A | * | 4/2000 | Rockwell | 177/133 |

* cited by examiner

Primary Examiner—Randy W. Gibson
(74) Attorney, Agent, or Firm—Thomte, Mazour & Niebergall; Dennis L. Thomte

(57) ABSTRACT

A ground-conforming portable truck scale which may be positioned on uneven ground for weighing a truck comprising a pair of longitudinally extending side truss members having a center cross-beam pivotally secured thereto and extending therebetween, a plurality of cross-beams loosely connected to the side truss member and extending therebetween, a front ramp pivotally secured to the forward ends of the side frame members, and a rear ramp pivotally secured to the rearward ends of the side truss members. Weigh cells are provided between the ends of the side truss members and the front and rear ramps.

11 Claims, 7 Drawing Sheets

GROUND-CONFORMING PORTABLE TRUCK SCALE

BACKGROUND OF THE INVENTION

1. Field of the Invention

This invention relates to a portable truck scale and more particularly to a ground-conforming portable truck scale which may be set up quickly for use on surfaces which may not be level.

2. Description of the Related Art

In the past, portable truck scales had to be small enough so as to be truly portable, but a disadvantage of those scales was that they were only able to weigh one or two axles at once, requiring too much time to complete the weighing. The portable truck scales of the past met with some success because they were constructed stiff and strong enough to resist flexing due to the outer frame's rigidity containing the load cells. This is not practical for manufacture, nor does the same work when weighing full trucks or three axles or more while still being portable. Further, the prior art portable truck scales had to be set up on a level location.

The portable truck scales of the prior art normally utilized electronic weigh cells. In order for the electronic weigh cells to repeat their accuracy they must, when unloaded, have the same tare weight equally on all four cells. To do this, typically, one would have to level all weigh cells so that the rigid supporting truck platform could be equally weighted on the cells. This requires much set-up time, making it only applicable to permanent scales, located and monumentally placed.

SUMMARY OF THE INVENTION

A ground-conforming portable truck scale is disclosed which may be positioned on the ground for weighing a truck and then raised therefrom to a transport position. The portable truck scale of this invention comprises first and second side truss members having a forward end, a rearward end, an upper end, and a lower end. The first and second side truss members are horizontally spaced-apart with each of the first and second side truss members having a plurality of spaced-apart openings formed therein along the lengths thereof which receive the ends of cross-beams extending between the first and second side truss members. A center pivot beam, having opposite ends, extends between the first and second side truss members at the approximate center length thereof with the opposite ends of the center pivot beam being pivotally secured, about a horizontal axis, to the first and second side truss members. A front ramp is pivotally secured to the forward ends of the first and second side truss members with the front ramp being pivotally secured to the first and second side truss members about a horizontal axis which is transverse to the length of the first and second side truss members and which is spaced rearwardly from the forward ends thereof. The front ramp is also pivotally secured to the forward ends of the first and second side truss members about a horizontal axis which is parallel to the length of the first and second side truss members. A tow hitch is secured to the first ramp for connection to a prime mover when the scale is in its transport position. A rear ramp is pivotally secured to the rearward ends of the first and second side truss members about a horizontal axis which is transverse to the length of the first and second side truss members and which is spaced forwardly from the rearward ends thereof. The rear ramp is also pivotally secured to the rearward ends of the first and second side truss members about a horizontal axis which is parallel to the length of the first and second side truss members. A wheel assembly is operatively connected to the rear ramp for supporting the rear ramp and the rearward ends of the first and second side truss members above the ground when the scale is in its transport position. A front lift jack assembly is operatively secured to the front ramp for raising the front ramp from a ground-engaging position to a transport position and for lowering the front ramp from its transport position to its ground-engaging position. A rear lift jack assembly is operatively secured to the rear ramp for raising the rear ramp from a ground-engaging position to a transport position and for lowering the rear ramp from its transport position to its ground-engaging position. Weigh (load) cells are operatively connected to the forward and rearward ends of each of the first and second side truss members. The weigh cells at the forward ends of the side truss members are positioned between the ends of the side truss members and the front ramp. The weigh cells at the rearward ends of the side truss members are positioned between the ends of the side truss members and the rear ramp.

It is a principal object of the invention to provide a ground-conforming portable truck scale.

A further object of the invention is to provide a ground-conforming portable truck scale which may be utilized on uneven ground.

A further object of the invention is to provide a ground-conforming portable truck scale which provides a rigid platform scale which may be towed, but which provides equal distribution of weight at different angles of level.

A further object of the invention is to provide a portable truck scale of the type described which has ramps at the forward and rearward ends thereof.

Still another object of the invention is to provide a ground-conforming portable truck scale which is quickly and easily set-up, regardless of the level of the ground conditions.

Still another object of the invention is to provide a ground-conforming portable truck scale which provides equal distribution of weight to four weigh cells at different angles of level.

Still another object of the invention is to provide a portable truck scale of the type described which is economical of manufacture, durable in use and refined in appearance.

These and other objects of the invention will be apparent to those skilled in the art.

DESCRIPTION OF THE PREFERRED EMBODIMENT

Figure 1:
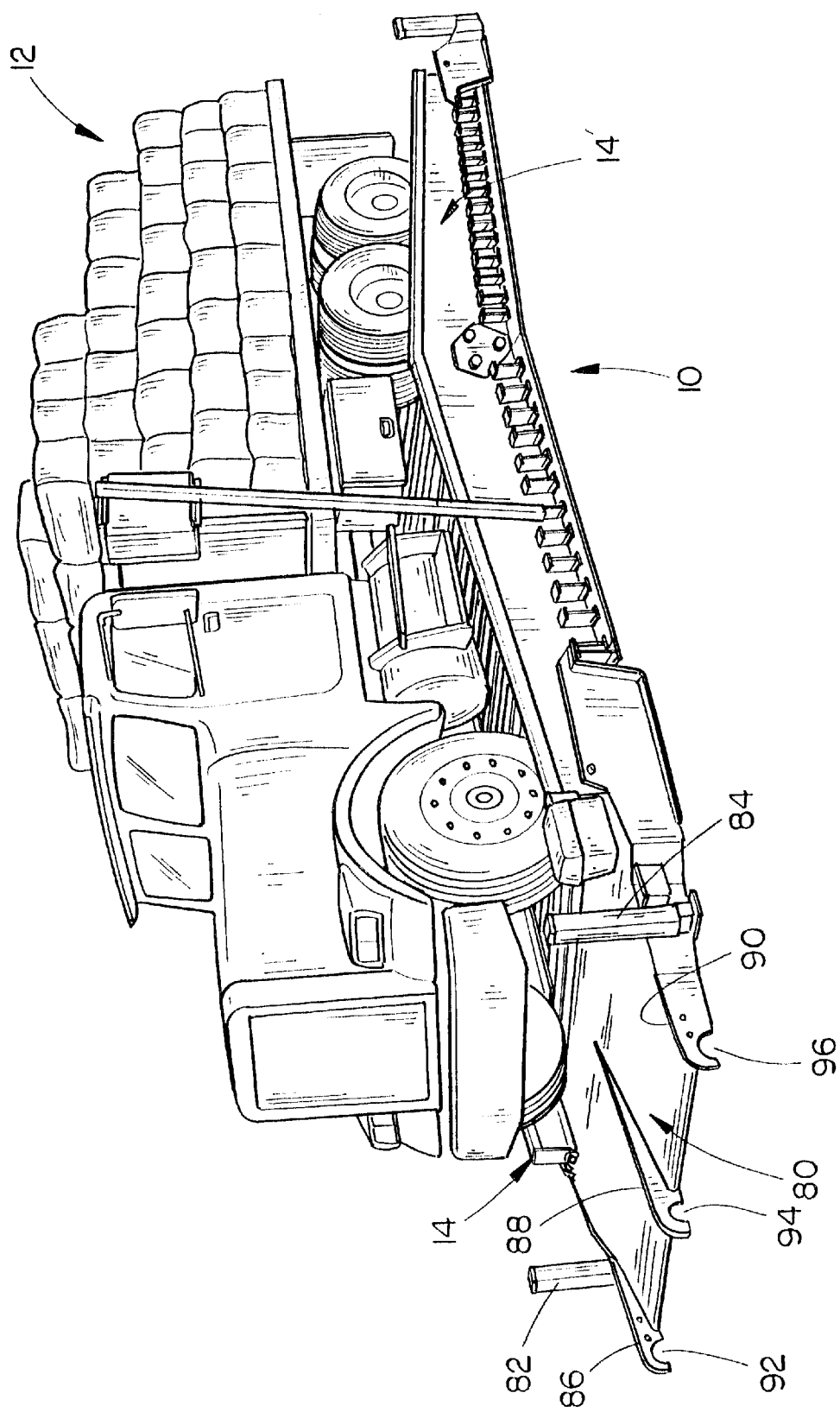
FIG. 1 is a front perspective view of the truck scale of this invention having a truck positioned thereon for weighing.

The ground-conforming portable truck scale of this invention is referred to generally by the reference numeral 10 and is designed to weigh a truck 12. Scale 10 includes a first side truss member 14 having a forward end 16, a rearward end 18, an upper end 20, and a lower end 22. As seen in the drawings, the upper and lower ends of side truss member 14 are angled so that the lower center portion of lower end 22 is positioned above the forward and rearward ends thereof so that the side truss member 14 will be maintained out of ground engagement should there be uneven ground between the ends thereof. Side truss member 14 includes a flange 24 which extends outwardly from the lower end thereof along the length thereof. The inner surface of side truss member 14 is also provided with an inwardly extending plate or flange 26 having a plurality of longitudinally spaced bolt openings 28 formed therein, each of which are adapted to receive a bolt 30 extending downwardly therethrough.

Figure 6:
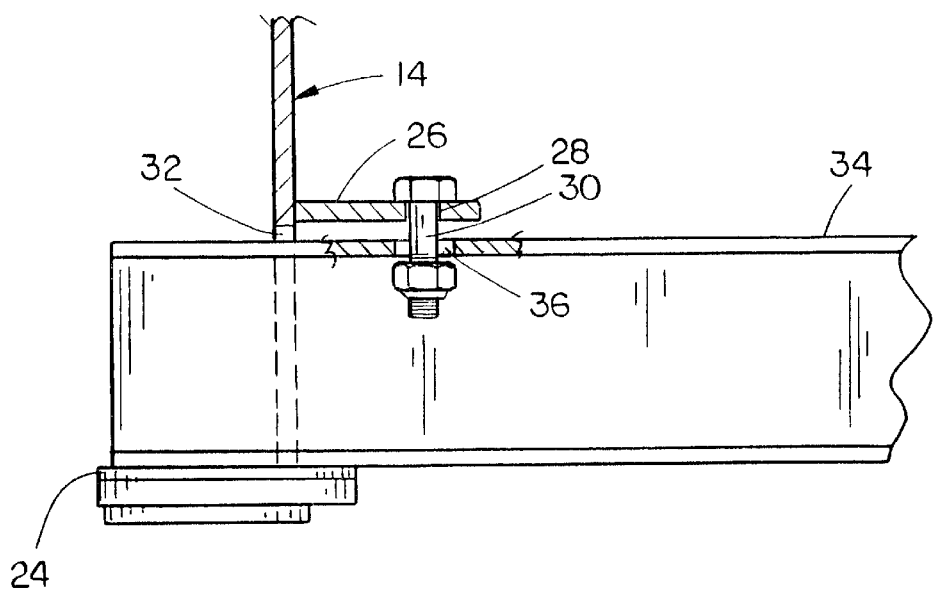
FIG. 6 is a sectional view illustrating the manner in which the cross-beams are loosely secured to the side truss members.

Side truss member 14 is provided with a plurality of longitudinally spaced openings 32 formed therein which are adapted to receive the ends of cross-beams 34 extending therethrough, as illustrated in FIG. 6. The openings 32 are sufficiently large enough so that the beams 34 will be loosely received therein. Each of the cross-beams 34 is provided with an opening 36 formed therein which receives one of the bolts 30. As seen in FIG. 6, the opening 36 is considerably larger than the diameter of the bolt 30 so that the openings 36 loosely receive the bolts 30.

The forwardmost cross-beam and the rearwardmost cross-beam have a length greater than the remaining cross-beams so that the ends thereof protrude outwardly a greater distance from the side truss members, for a purpose to be described hereinafter. For purposes of description, the forwardmost cross-beam will be referred to by the reference numeral 34F while the rearwardmost cross-beam will be referred to by the reference numeral 34R.

Scale 10 also includes a side truss member 14' which is identical to side truss member 14 and which will not be described in detail. However, the "'" will used on side truss member 14' to identify the structure thereon which is identical to the structure on side truss member 14.

Figure 5:
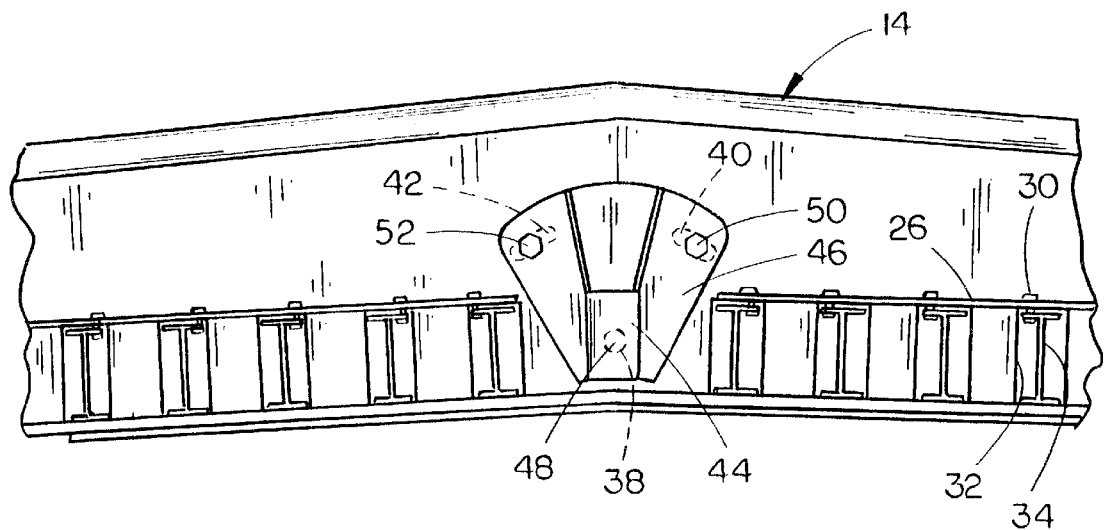
FIG. 5 is a partial side elevational view of the scale.

The center portion of side truss member 14 is provided with a bolt opening 38 and a pair of arcuate slots 40 and 42 formed therein above opening 38 (FIG. 5). A center pivot beam 44 is positioned between the side truss members 14 and 14', as illustrated in the drawings, and has plates 46 secured to the outer ends thereof which are positioned inwardly of side truss members 14 and 14'. Bolts 48, 50 and 52 extend through suitable openings formed in each of the plates 46 with the outer ends thereof being received by the opening 38 and slots 40 and 42, respectively. Plates 54 are positioned at the outer sides of side truss members 14 and 14' and are provided with a bolt opening formed in the lower end thereof adapted to receive the bolt 48 and arcuate slots 56 and 58 adapted to receive the bolts 50 and 52, respectively. Thus, the center pivot beam 44 allows the side truss members 14 and 14' to pivot with respect to one another so that the side truss members 14 and 14' may be positioned on uneven ground.

Figure 7:
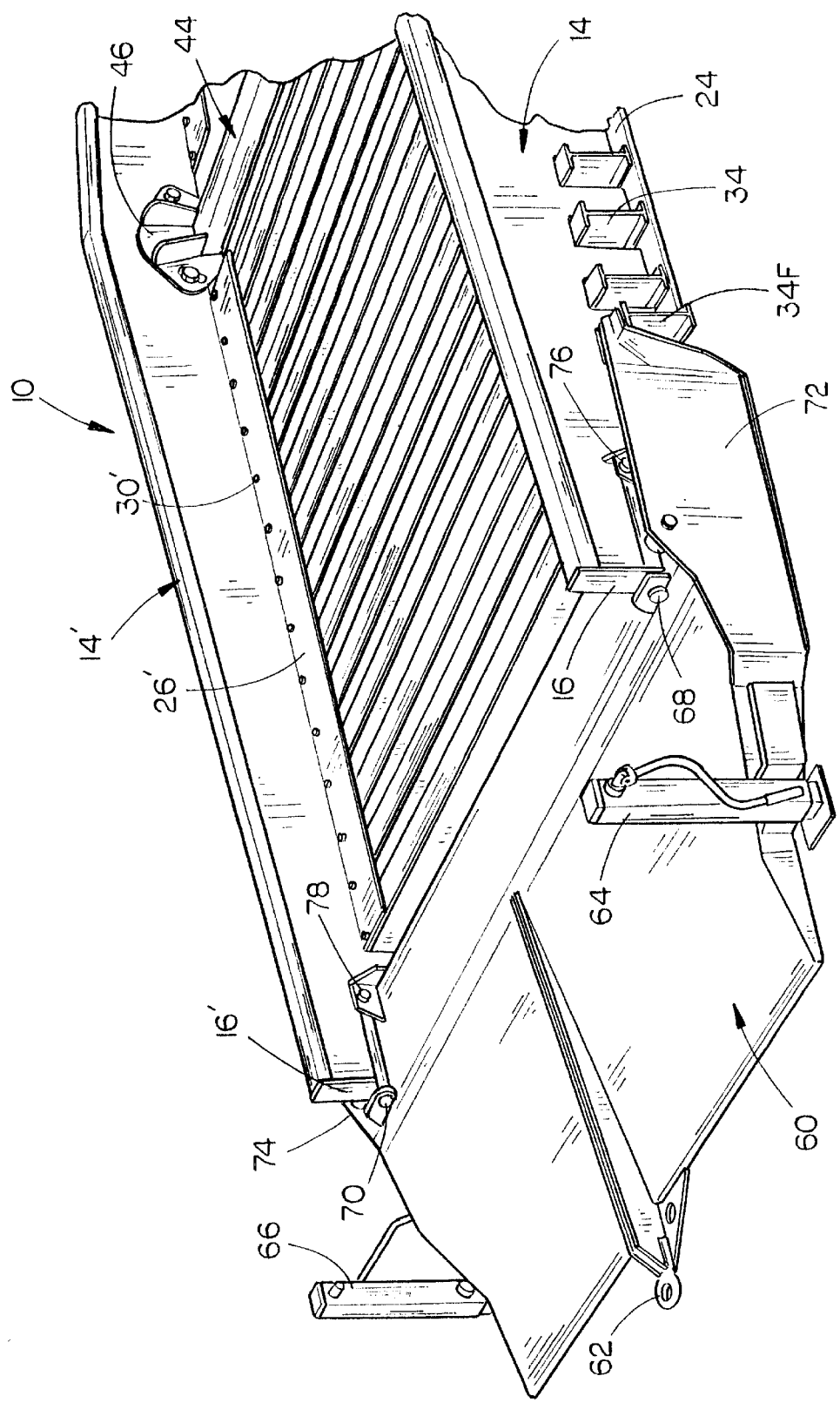
FIG. 7 is a partial front perspective view of the truck scale in its ground-engaging position.
Figure 8:
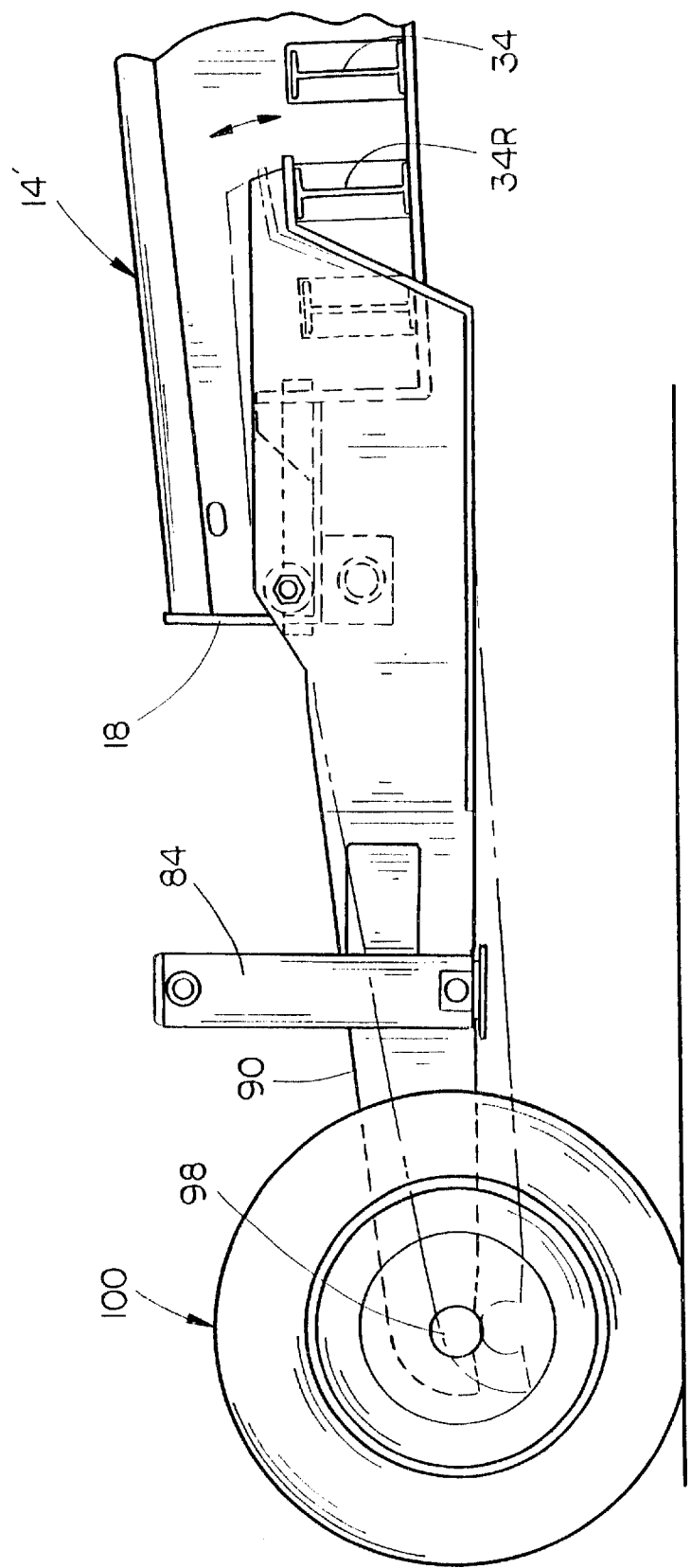
FIG. 8 is a partial side elevational view of the rear end of the truck scale when it has been raised to its transport position.

The numeral 60 refers to a front ramp having a tow hitch 62 extending forwardly therefrom for connection to a prime mover such as a truck, tractor or the like. Ramp 60 is provided with a pair of lift jacks 64 and 66 secured thereto for raising and lowering the front ramp 60 and the forward ends of the side truss members 14 and 14'. Front ramp 60 is pivotally secured to the forward ends of side truss members 14 and 14' about a horizontal axis parallel to the longitudinal axis of the side truss members 14 and 14' at 68 and 70, as seen in FIG. 7. Front ramp 60 is provided with rearwardly extending side portions 72 and 74 which are positioned outwardly of the side truss members 14 and 14' and which are pivotally secured to side truss members 14 and 14' about a horizontal axis which is disposed transversely to the longitudinal axis of the side truss members 14 and 14' and which is referred to generally by the reference numerals 76 and 78, respectively. Thus, the pivotal connection of the front ramp 60 to the side truss members 14 and 14' about horizontal axes which are parallel and transverse to the longitudinal axis of the side truss members 14 and 14' enables the forward ends of the side truss members 14 and 14' to pivotally move up and down with respect to the front ramp 60 or pivotally move side-to-side with respect to the front ramp 60 and vice versa. As seen in FIG. 7, the rearward end of side portion 72 is positioned above the outer end of cross-beam 34F. When the front ramp 60 has been raised from its ground-engaging position to its transport position, the rearward end of side portion 72 pivots downwardly into engagement with the upper surface of the end of cross-beam 34F to provide a rigid connection between the ramp 60 and the side truss member 14'. The rearward end of side portion 74 of ramp 60 engages the other end of the cross-beam 34F, as just described, to provide a rigid connection between the other side of the ramp 60 and the side truss member 14'.

The numeral 80 refers to a rear ramp which is pivotally connected to the rearward ends of side truss members 14 and 14' in an identical fashion to the manner in which front ramp 60 is pivotally secured to the forward ends of the side truss members 14 and 14'. In other words, each side of the rear ramp 80 is pivotally connected to the associated side truss member about a pair of horizontal axes which are transverse and parallel to the longitudinal axis of the associated side truss member. A pair of lift jacks 82 and 84 are operatively secured to the rear ramp 80 for raising and lowering the rear ramp 80 with respect to the ground. The rearward end of rear ramp 80 is provided with rearwardly extending arms 86, 88 and 90 which have arcuate openings 92, 94 and 96 formed therein which are adapted to removably receive the axle 98 of a rear wheel assembly 100 so that the scale may be transported. In other words, the lift jacks 82 and 84 raise the rear ramp 80 sufficiently above the ground to enable the axle 98 to be received in the openings 92, 94 and 96 so that the wheels on the opposite ends of the axle 98 will support the rear ramp above the ground during transport. The wheel assembly 100 is secured to the arms 86 and 90 by any convenient means such as by bolts extending through the mating bolt openings.

Figure 2:
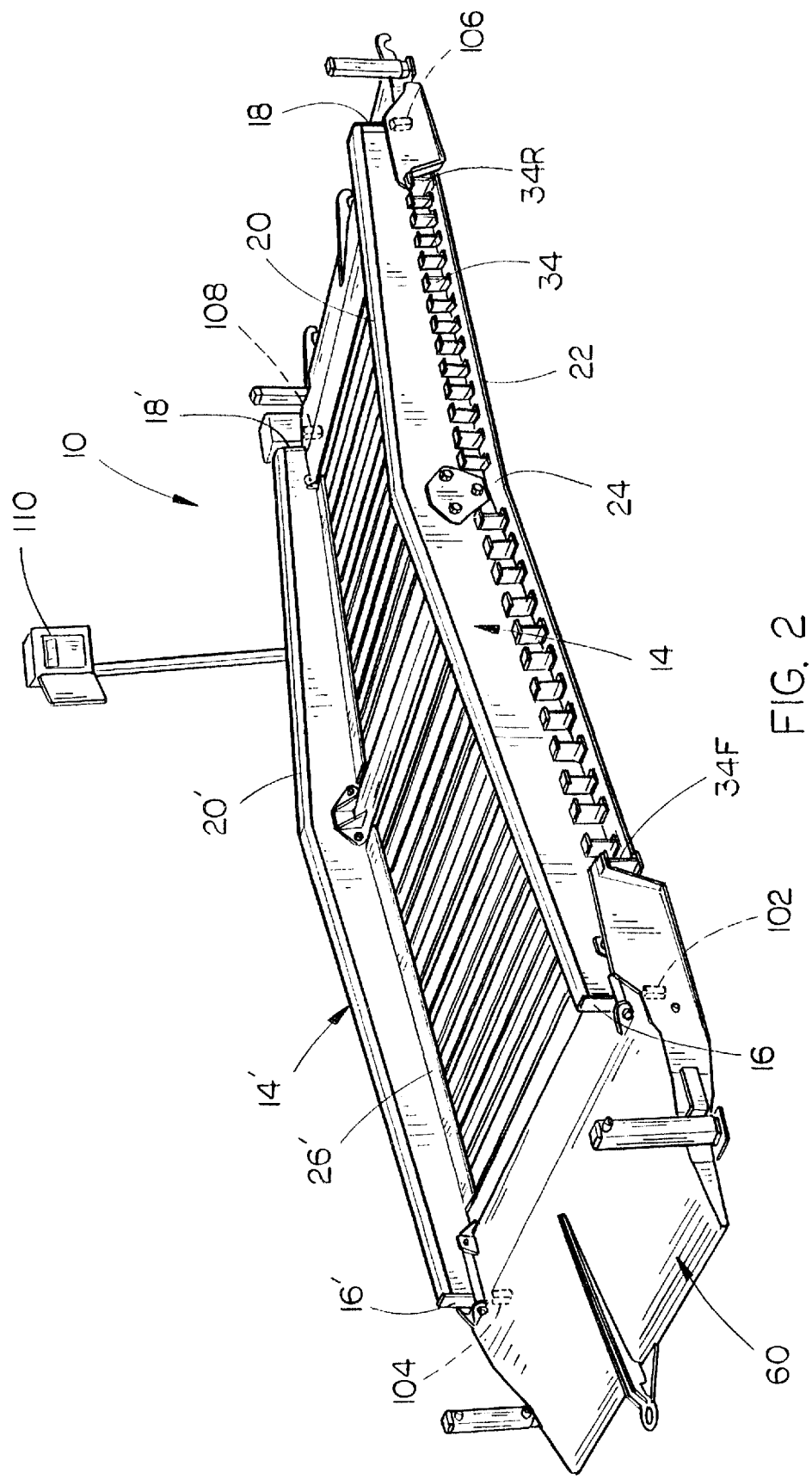
FIG. 2 is a rear perspective view of the truck scale of this invention.
Figure 3:
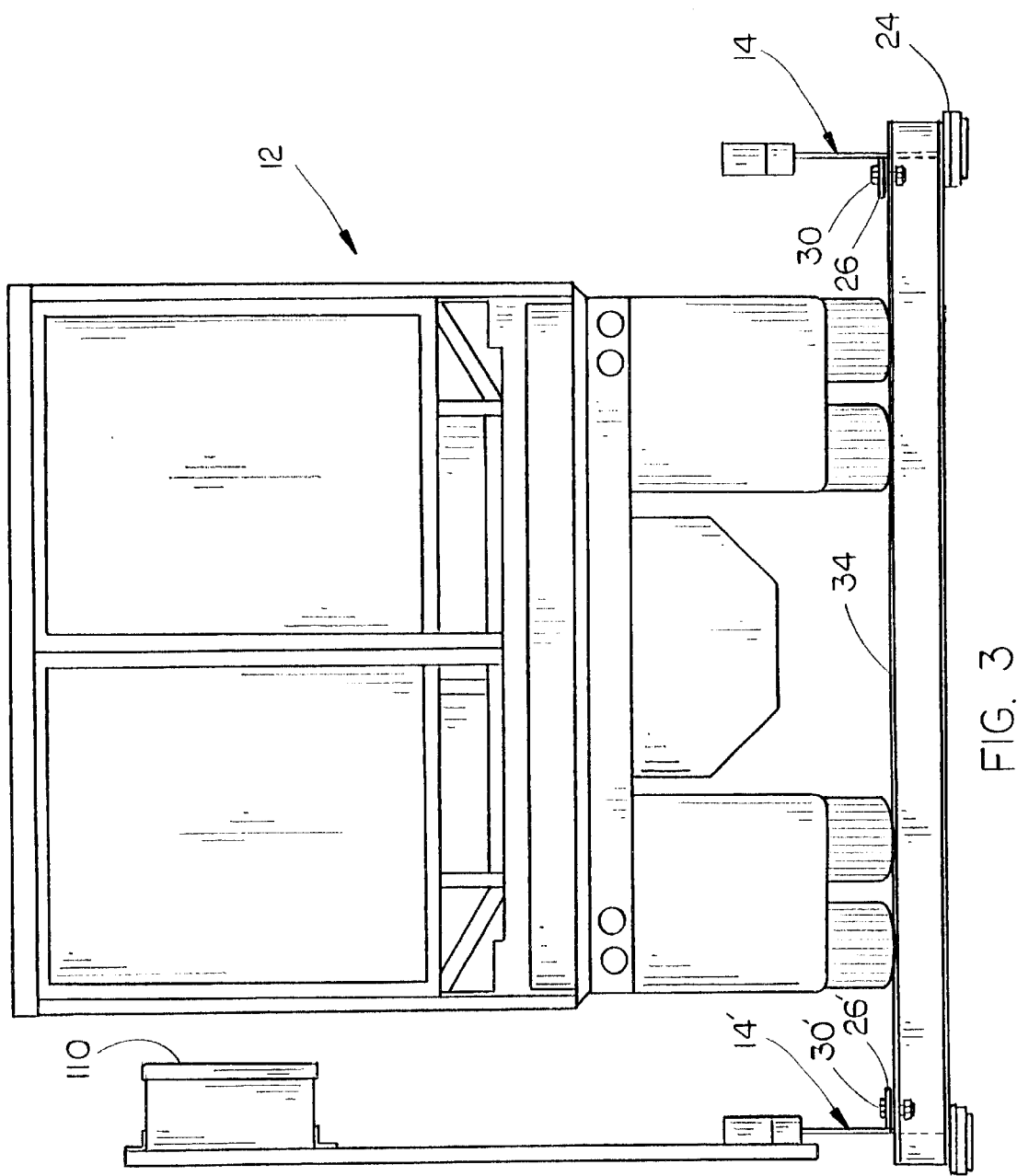
FIG. 3 is a rear elevational view of the truck scale of this invention.
Figure 4:
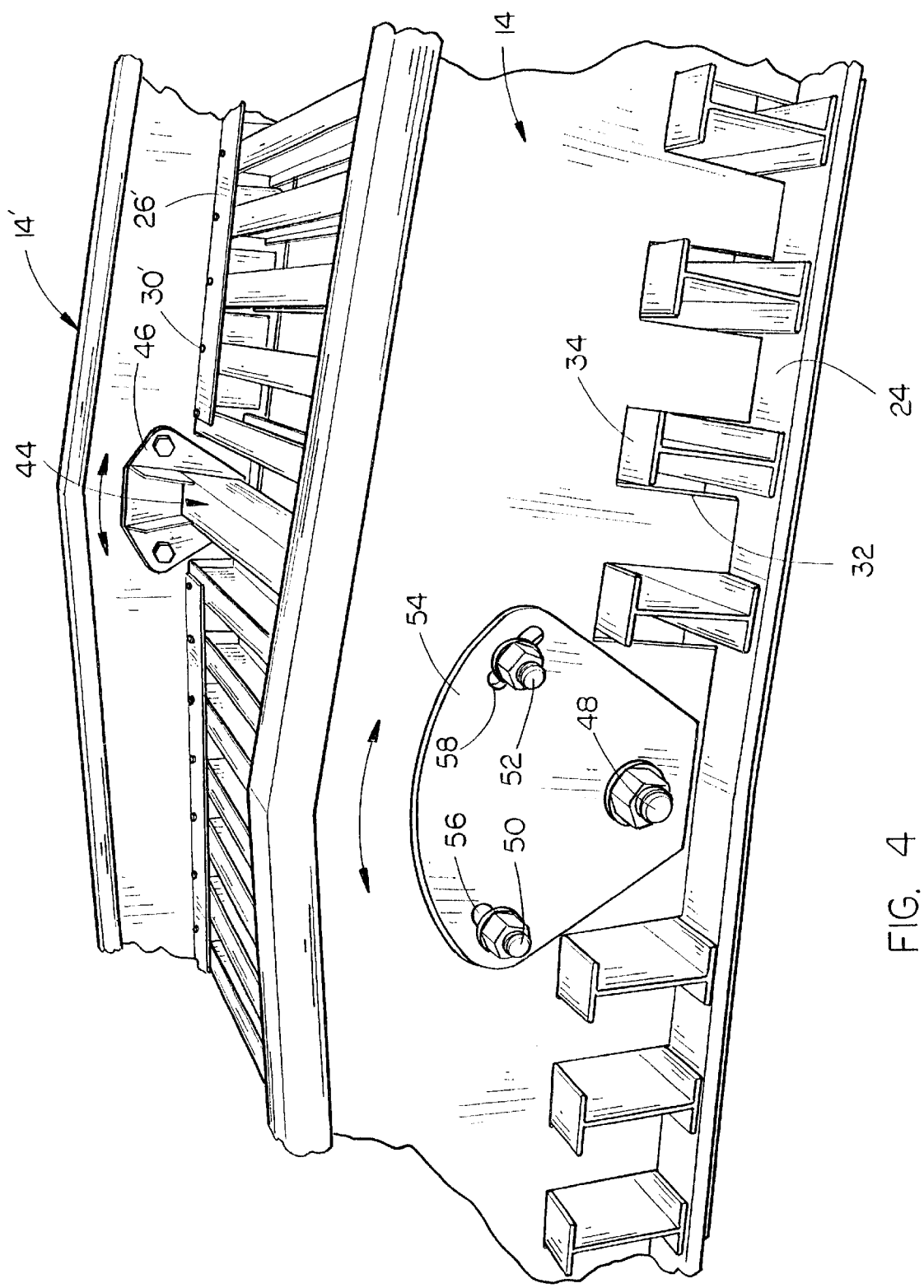
FIG. 4 is partial perspective view of the invention illustrating the center pivot beam and its relationship to the side truss members.

As seen in FIG. 2, a conventional weigh cell 102 is positioned between the forward end of side truss member 14 and one side of front ramp 60. A conventional weigh cell 104 is positioned between the forward end of side truss member 14' and the other side of front ramp 60. As also seen in FIG. 2, a conventional weigh cell 106 is positioned between the rearward end of side truss member 14 and one side of rear ramp 80. A conventional weigh cell 108 is positioned between the rearward end of side truss member 14' and the other side of rear ramp 80. Weigh cells 102, 104, 106 and 108 are operatively connected to a means for indicating the weight being sensed by the weigh cells which is generally referred to by the reference numeral 110.

It can therefore be seen that a ground-conforming portable truck scale has been provided through the use of the pivotal connections between the ends of the side truss members and the front and rear ramps as well as the cross-beams extending therebetween. The cross-beams 34, by being loosely received in their respective openings in the side truss members, permit the side truss members to flex and twist with respect to one another which results in an equal distribution of weight on the four weigh cells at different angles of level. This is accomplished by: (1) designing a connecting pivot beam 44 at the center length of the side truss members 14 and 14'; (2) utilizing lateral unfastened beams 34 so that they are able to move/self-adjust easily when the scale is set up on uneven terrain, thus causing an oscillating or conforming platform; and (3) to allow the front and rear ramps to lay flat on the ground.

The unique engagement of the rearward ends of the sides of the front ramp with respect to the opposite ends of the beam 34F and the engagement of the opposite sides of the rear ramp 80 with respect to the cross-beam 34R provides a rigid and stable frame for the scale in the transport position.

Thus it can be seen that the invention accomplishes at least all of its stated objectives.

I claim:

1. A ground-conforming portable truck scale which may be positioned on the ground for weighing a truck and raised therefrom to a transport position, comprising:

a first side truss member having a forward end, a rearward end, an upper end, and a lower end;

a second side truss member having a forward end, a rearward end, an upper end, and a lower end;

said first and second side truss members being horizontally spaced-apart;

each of said first and second side truss members having a plurality of spaced-apart openings formed therein along the lengths thereof which receive the ends of cross-beams extending between said first and second side truss members;

said cross-beams having upper and lower ends;

a center pivot beam, having opposite ends, extending between said first and second side truss members at the approximate center length thereof;

said opposite ends of said center pivot beam being pivotally secured, about a horizontal axis, to said first and second side truss members;

a front ramp pivotally secured to said forward ends of said first and second side truss members;

said front ramp being pivotally secured to said first and second side truss members about a horizontal axis which is transverse to the length of said first and second side truss members;

said front ramp also being pivotally secured to said forward ends of said first and second side truss members about a horizontal axis which is parallel to the length of said first and second side truss members;

a tow hitch secured to said first ramp for connection to a prime mover when the scale is in its transport position;

a rear ramp pivotally secured to said rearward ends of said first and second side truss members;

said rear ramp being pivotally secured to said first and second side truss members about a horizontal axis which is transverse to the length of said first and second side truss members;

said rear ramp also being pivotally secured to said rearward ends of said first and second side truss members about a horizontal axis which is parallel to the length of said first and second side truss members;

a wheel assembly operatively connected to said rear ramp for supporting said rear ramp and said rearward ends of said first and second side truss members above the ground when the scale is in its transport position;

a front lift jack assembly for raising said front ramp from a ground-engaging position to a transport position and for lowering said front ramp from its transport position to its ground-engaging position;

a rear lift jack assembly for raising said rear ramp from a ground-engaging position to a transport position and for lowering said rear ramp from its transport position to its ground-engaging position;

a first weigh cell operatively connected to the forward end of said first side truss member;

a second weigh cell operatively connected to the rearward end of said first side truss member;

a third weigh cell operatively connected to the forward end of said first side truss member;

and a fourth weigh cell operatively connected to the rearward end of said second side truss member;

said first, second, third and fourth weigh cells being operatively connected to a means for indicating the weight of the vehicle supported upon said cross-beams.

2. The ground-conforming portable truck scale of claim 1 wherein said wheel assembly is removably secured to said rear ramp.

3. The ground-conforming portable truck scale of claim 1 wherein said cross-beams are movably received by said openings.

4. The ground-conforming portable truck scale of claim 1 wherein said cross-beams are loosely received by said openings.

5. The ground-conforming portable truck scale of claim 3 further including means for maintaining said cross-beams in said openings.

6. The ground-conforming portable truck scale of claim 4 further including means for maintaining said cross-beams in said openings.

7. The ground-conforming portable truck scale of claim 1 wherein said lower ends of said first and second side truss members are angled so that the forward and rearward lower ends thereof are positioned below the center lower ends thereof.

8. The ground-conforming portable truck scale of claim 1 wherein said front ramp includes rearwardly extending side portions which are positioned outwardly of said first and second side truss members; said rearwardly extending side portions of said front ramp adapted to engage the outer ends of one of said cross-beams when said front ramp is raised to its transport position to add rigidity to the scale during transport.

9. The ground-conforming portable truck scale of claim 1 wherein said rear ramp includes forwardly extending side portions which are positioned outwardly of said first and second side truss members; said forwardly extending side portions of said rear ramp adapted to engage the outer ends of one of said cross-beams when said rear ramp is raised to its transport position to add rigidity to the scale during transport.

10. The ground-conforming portable truck scale of claim 8 wherein said rear ramp includes forwardly extending side portions which are positioned outwardly of said first and second side truss members; said forwardly extending side portions of said rear ramp adapted to engage the outer ends of one of said cross-beams when said rear ramp is raised to its transport position to add rigidity to the scale during transport.

11. The ground-conforming portable truck scale of claim 1 wherein the lower ends of each of said first and second side truss members have outwardly extending flanges which support the ends of said cross-beams.

* * * * *